3,341,576
PREPARATION OF BENZENE 1,4-BIS (PHENYLPHOSPHINIC ACID)
David L. Herring, Riverside, Calif., assignor to the United States of America as represented by the Secretary of the Navy
No Drawing. Filed July 17, 1963, Ser. No. 295,854
1 Claim. (Cl. 260—500)

The invention herein described may be manufactured and used by or for the Government of the United States of America for governmental purposes without the payment of any royalties thereon or therefor.

The present invention relates to a general method for the preparation of substituted aryl diphosphines. These materials are useful intermediates in the synthesis of new and useful thermally stable, thermoplastic and thermosetting polymeric materials, which may be moulded, cast or extruded.

A previous method is reported by J. Chatt and F. A. Hart, J.C.S. 1378 (1960) which can be described by the following equations:

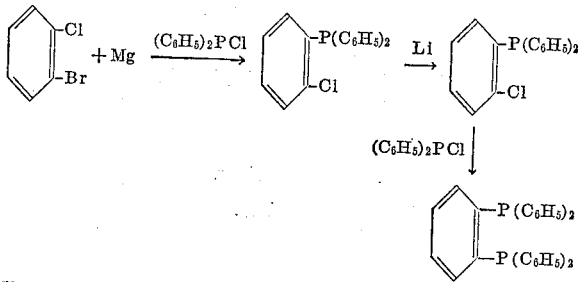

However, the above method is tedious, costly and the yield or product is low. Whereas, the method of the present invention is less complicated, inexpensive and the yields of product are higher.

An object of the invention is to provide a method for the preparation of substituted aryl diphosphines.

Another object of the invention is to provide a method for preparing a new intermediate compound p—$C_6H_5PN(C_2H_5)_2C_6H_4PN(C_2H_5)_2C_6H_5$ A further object of the invention is to provide a method for preparing a new thermally stable compound p—$C_6H_5P(O)(OH)C_6H_4P(O)(OH)C_6H_5$ Other objects and many of the attendant advantages of this invention will become readily appreciated as the same becomes better understood by reference to the following detailed description.

The present invention is disclosed in the following procedure for preparing the new compound benzene 1,4-bis(phenyl phosphinic acid) of the formula p—$C_6H_5P(O)(OH)C_6H_4P(O)(OH)C_6H_5$ All reactions were carried out in an inert atmosphere with conventional equipment and reagent grade starting materials. To 64.0 g. of n-butyllithium in 450 ml. of pentane-hexane mixture, a solution of 600 ml. of hexane containing 94.0 g. of p-dibromobenzene was added dropwise with stirring over the course of 1½ hours. The resulting mixture was heated at 50–55° C. for 48 hours. During the heating process p-dilithiobenzene formed in about 50% yield. [The compound $C_6H_5P(Cl)N(C_2H_5)_2$ used in the next step of the reaction was formed in the following manner: To 357.8 g. (2.0 moles) of $C_6H_5PCl_2$ was first added 1500 ml. of dry n-hexane; then, with vigorous stirring, 292.0 g. (4.0 moles) of $(C_2H_5)_2NH$ was added dropwise over the course of 1½ hours. After the addition was completed, the resulting mixture was filtered to remove the by product $(C_2H_5)_2NH \cdot HCl$, which was then extracted with three 350 ml. portions of n-hexane. The filtrate and n-hexane washings were combined and fractionally distilled to yield 248.3 g. (81%) of water-white $C_6H_5P(Cl)N(C_2H_5)_2$ calcd. for $C_{10}H_{15}PNCl$: N, 6.5, found: N, 6.1]. To the slurry of p-dilithiobenzene, 215 g. of $C_6H_5P(Cl)N(C_2H_5)_2$ was added dropwise over the course of an hour. After the addition was completed, the resulting mixture was heated at 50–55° C. for 3 hours, then filtered. The insoluble material was extracted with three 150 ml. portions of boiling n-hexane. The filtrate and washings were combined, and 73.1 g. of $(C_2H_5)_2NH$ was added to convert any remaining starting material to $C_6H_5P[N(C_2H_5)_2]_2$ The precipitate of $(C_2H_5)_2NH \cdot HCl$ which formed was removed by filtration and the resulting filtrate was fractionally distilled to remove unreacted starting material as $C_6H_5P[N(C_2H_5)_2]_2$ (B.P. 82–104° C./0.8–10 mm.) leaving a liquid residue containing p—$C_6H_5P[N(C_2H_5)_2]C_6H_4P[N(C_2H_5)_2]C_6H_5$ (i.e. 1,4-bis(phenyl diethylamino phosphino)benzene). Treating a sample of the p—$C_6H_5P[N(C_2H_5)_2]C_6H_4P[N(C_2H_5)_2]C_6H_5$ with dilute HCl and then 30% $H_2O_2$, within the range 25° C.–100° C., resulted in the formation of the water-insoluble, cream colored crude acid p—$C_6H_5\overset{O}{\underset{\|}{P}}(OH)C_6H_4\overset{O}{\underset{\|}{P}}(OH)C_6H_5$ The product was recrystallized from $C_2H_5OH$ (also soluble in $C_6H_5NO_2$) and after drying M.P. 330–333° C. (decomp.) anal. calcd. for $C_{18}H_{16}P_2O_4$: C, 60.4; H, 4.4; P. 17.3; O, 17.8. Found C, 60.2; H, 4.5; P, 17.3; O, 17.9.

The sequence of reactions used in the typical procedure above can be described by the following general equations:

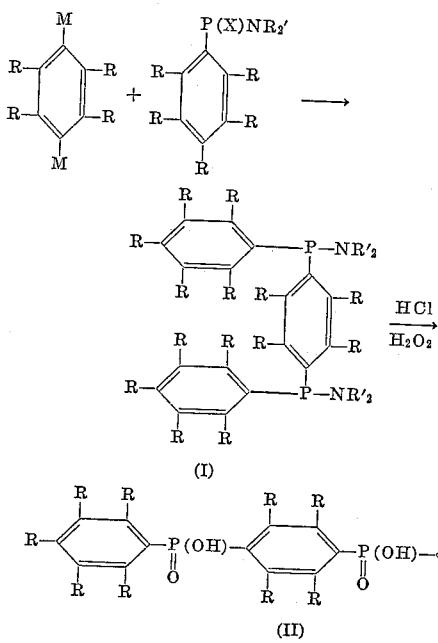

where M=alkali metal, MgX or HgX; P=phosphorus; R=H, alkyl, aryl; R'=alkyl or aryl; X=halogen.

The intermediate compound (I) may be reacted with anhydrous HCl to yield, for example, derivatives such as

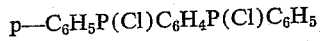

a family of compounds useful in the formation of (P—N) and (P—B) bonded polymers. Compound II, the aryl substituted diphosphonic acid represents a family of compounds useful in the formation of polyesters, poly anhydrides and polymers having the linkage

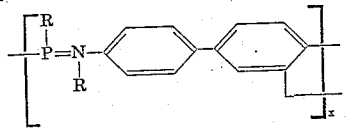

Where R=alkyl, aryl or aryloxy, R'=H, alkyl, or aryl.

Obviously many modifications and variations of the present invention are possible in the light of the above teachings. It is therefore to be understood that within the scope of the appended claim the invention may be practiced otherwise than as specifically described.

What is claimed is:

The synthesis of benzene 1,4-bis(phenyl phosphinic acid) which comprises:

(a) slowly adding two molar quantities of

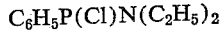

to a pentane-hexane slurry of one molar quantity of p-dilithiobenzene and heating the resulting mixture at 50–55° C. to form a liquid reaction product which is freed from both insoluble starting materials and insoluble reaction by-products by filtration and extraction of any solid materials with boiling n-hexane, then fractionally distilling the combined filtrate and extract to recover the compound

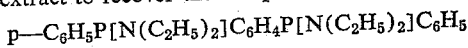

(b) reacting said recovered compound

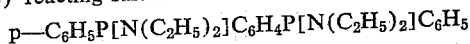

with dilute HCl followed by reaction with 30% $H_2O_2$ at 25–100° C. to form a water insoluble, cream colored, crude acid, (c) purifying said crude acid by recrystallization from a member of the group consisting of ethanol and nitrobenzene to yield a pure product of the formula

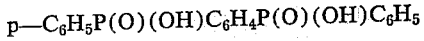

having a melting point of 330–333° C.

References Cited

UNITED STATES PATENTS

| | | | |
|---|---|---|---|
| 2,934,564 | 4/1960 | Burg et al. | 260—643 |
| 3,147,313 | 4/1964 | Hsieh | 260—500 |
| 3,157,694 | 11/1964 | Harwood | 260—932 |
| 3,189,564 | 6/1965 | Washburn et al. | 260—551 |

FOREIGN PATENTS

| | | |
|---|---|---|
| 921,463 | 3/1963 | Great Britain. |

OTHER REFERENCES

Frank: "Chem. Rev.," vol. 61 (1961), p. 394.

Kosolapoff: "Organophosphorus Compounds," (1950), pp. 133, 137 and 138.

LEON ZITVER, *Primary Examiner.*

J. E. EVANS, *Assistant Examiner.*